United States Patent [19]

Pelzek

[11] 4,048,378
[45] Sept. 13, 1977

[54] ADHESIVE LAMINATED PACKAGING MATERIALS

[75] Inventor: Victor J. Pelzek, Milwaukee, Wis.

[73] Assignee: Browne Packaging, Inc., Milwaukee, Wis.

[21] Appl. No.: 748,527

[22] Filed: Dec. 8, 1976

[51] Int. Cl.$^2$ .................... B32B 27/08; B32B 27/30; B32B 27/36
[52] U.S. Cl. ............................ 428/483; 260/897 R; 428/216; 428/520; 428/522; 428/910
[58] Field of Search ............... 428/213, 214, 215, 216, 428/520, 910, 483, 522; 260/897 R

[56] References Cited

U.S. PATENT DOCUMENTS

| | | | |
|---|---|---|---|
| 3,370,972 | 2/1968 | Nagel et al. | 428/216 |
| 3,445,324 | 5/1969 | Curler et al. | 428/216 |
| 3,455,720 | 7/1969 | Davies et al. | 428/910 |
| 3,524,795 | 8/1970 | Peterson | 428/216 |
| 3,619,344 | 11/1971 | Wolinski et al. | 428/910 |
| 3,682,767 | 8/1972 | Britton et al. | 428/520 |
| 3,912,843 | 10/1975 | Brazier | 428/910 |
| 3,925,591 | 12/1975 | Breitenfellner et al. | 428/483 |
| 3,953,660 | 4/1976 | Ishida | 428/522 |

*Primary Examiner*—William J. Van Balen
*Attorney, Agent, or Firm*—Michael, Best & Friedrich

[57] ABSTRACT

A three-ply, flexible, laminated, heat-sealable packaging material which is resistant to flex cracking and pinhole development is made by bonding an inner film of a heat-sealable polymeric material to one surface of a core film of biaxially oriented polypropylene coated on both sides with Saran and by bonding an outer film of biaxially oriented polypropylene to the other surface of the core film with an adhesive composition including bond formers consisting essentially of about 70 to about 90 weight % of an ethylene-vinyl acetate copolymer which contains about 20 to about 40 weight % vinyl acetate, about 10 to about 30 weight % of a tackifying resin, and 0 to about 5 weight % of a plasticizer. A coating of the adhesive composition is applied to the inner surface of the outer film as an organic solvent solution and the coating dried to provide a residual layer of the bond formers which provides the bond between the core film and the outer film. A two-ply, heat-sealable packaging material is made by omitting the outer film and bonding a film similar to the above core film to an inner film of a heat-sealable polymeric material with the above adhesive composition.

8 Claims, No Drawings

ADHESIVE LAMINATED PACKAGING MATERIALS

BACKGROUND OF THE INVENTION

This invention relates to flexible, laminated, heat-sealable packaging materials which are particularly useful for packaging food products, to a method for producing such packaging materials by adhesive laminating, and to an adhesive composition which can be used to produce such packaging materials by adhesive laminating.

Flexible packaging materials used for packaging food products, such as cheese, meat and the like, ordinarily must be impervious to moisture and gas so as to prevent ingress or egress of moisture and to prevent ingress of oxygen which can cause a spoilage of the food product. Also, the packaging material should have sufficient flexibility to enable the package formed therefrom to withstand flexing and bending during handling and shipment without cracking and developing small pinholes.

In one typical application, a flexible packaging material is first formed in a sleeve-like package which surrounds the cheese being packaged and the ends of this package are sealed after flushing or purging with an inert gas such as carbon dioxide, nitrogen and the like. The sealed package maintains a blanket of the inert gas over the cheese, thereby minimizing mold development during storage. The end portions of the package normally are subjected to considerable flexing during handling and shipping and, unless the package material is capable of withstanding this flexing without cracking, small pinholes can develop. When this occurs, the protective blanket of inert gas escapes from the package with a resultant acceleration in mold development.

Coated and laminated packaging materials including two or more thin plastic films have been used for this purpose. For example, U.S. Pat. No. 3,445,324 (Curler et al.) discloses such a packaging material including an inner film or layer of a flexible, heat-sealable, thermoplastic polymeric material, a core film of cellophane coated on both sides with a vinylidene chloride polymer (Dow Chemical "Saran") and an outer film of polypropylene. The various films making up the laminated material typically are bonded together by adhesive laminating and/or extrusion laminating.

In the first technique, one adjoining surface of the films is coated with a glue or adhesive composition and the films subsequently are pressed together by passing between a pair of counterrotating pressure rollers. Conventional glues and adhesives used for this purpose usually employ curing-type polymers which cross link to form a very tight bond between the adjoining films. This tight bond permits little or no relative movement between the bonded films. Consequently, the films making up the laminate tend to act as a one-piece unit during flexing and bending, causing flex cracks and pinholes to develop.

In the second technique, a layer of a molten thermoplastic, such as polyethylene, is extruded between the outer film and the core film prior to their passage between a pair of pressure rollers. Upon cooling, the intervening layer of polyethylene provides an adherent bond between the films and the flexibility of the polyethylene apparently is sufficient to afford some relative movement between the films during flexing and bending, thereby minimizing flex cracking. The above-mentioned U.S. Pat. No. 3,445,324 discloses such an extrusion laminating technique as being preferred for making a flexible, laminated packaging material.

Extrusion equipment required for the extrusion laminating technique represents a substantial capital expenditure. Therefore, small processors employing conventional, less-expensive plastic film laminating equipment and using conventional laminating glues or adhesives have been unable to use such equipment to produce flexible, laminated packaging materials which are heat-sealable, gas and moisture impervious, and resistant to flex cracking and pinhole development upon being subjected to flexing and bending.

SUMMARY OF THE INVENTION

An object of the invention is to provide an adhesive composition which is capable of bonding thin plastic films together in a manner whereby the resultant laminate can be flexed with minimum cracking and pinhole development.

Another object of the invention is to provide a method for producing a flexible, laminated packaging material, which includes at least two plastic films and is resistant to flex cracking and pinhole development, by adhesive laminating.

A further object of the invention is to provide a multiply, flexible, heat-sealable material which is impervious to gas and moisture and resistant to flex cracking and pinhole development.

Other objects, aspects and advantages of the invention will become apparent upon reviewing the following detailed description of the invention.

The invention provides an adhesive composition including bond-formers, consisting essentially of about 70 to about 90 weight % of an ethylene-vinyl acetate copolymer which contains about 20 to about 40 weight % vinyl acetate, about 10 to about 30 weight % of a tackifying resin, and 0 to about 5 weight % of a permanent plasticizer for polyolefin resins, dissolved in a volatile, normally liquid organic solvent which has a boiling point substantially below the softening point of the plastic film on which the adhesive composition is to be applied as a solvent solution and which is compatible with that film. After a coating of the liquid adhesive composition has been applied over one surface of the film, the solvent is removed to provide a residual layer of the bond formers and the adhesive-coated film is pressed against another film or substrate to form the desired laminate. The resultant bond provided by the intervening layer of bond formers is sufficiently "soft" or flexible to permit some relative movement between the laminated films during bending and flexing, thereby minimizing flex cracking and pinhole development.

The adhesive composition is particulary adaptable for producing flexible, laminated, heat-sealable, packaging materials, which are impervious to gas and moisture and are resistant to flex cracking, by conventional adhesive laminating techniques. In one embodiment, there is provided a three-ply, flexible, heat-sealable packaging material including a core film of biaxially oriented polypropylene coated on both sides with a layer of a vinylidene chloride copolymer, an inner film of a heat-sealable polymeric resinous material bonded to one side of the core film and an outer film of biaxially oriented polypropylene bonded to the other side of the core film by an intervening layer of the bond formers of the liquid adhesive composition. In another embodiment, there is provided a two-ply wrapper material including, for example, an outer film of biaxially oriented polypropylene coated on both sides with a layer of a vinylidene chloride copolymer and an inner film of a heat-sealable, polymeric resinous material bonded to one side of the outer film by an intervening layer of the bond formers of the liquid adhesive composition.

DESCRIPTION OF THE PREFERRED EMBODIMENTS

While the adhesive composition of the invention is particularly useful for adhesive laminating polypropylene films to films formed from other synthetic plastic materials and will be described primarily for that application, it can be used for other purposes such as for bonding together two films of polypropylene or similar polyolefin resin materials and for bonding polypropylene and other polyolefin resin to materials other than plastics, such as paper, textiles and the like.

As mentioned above, the adhesive composition is applied on one surface of a film as an organic solvent solution and the solvent is removed to provide a residual layer of the bond formers. Accordingly, the organic solvent used is normally liquid and is capable of dissolving the ingredients making up the bond-forming portin. Also, in order to permit the solvent to be conveniently removed within a reasonably short time period by forced drying in a heated oven or the like without causing stretching or other distortion of the film, the solvent should have a boiling point substantially below the softening or melting point of the film on which it is applied as a coating. Further, the solvent should be compatible with the polyolefin resin on which the liquid adhesive composition is applied. When used herein in conjunction with organic solvent, the term "compatible" means solvents which can remain in surface contact with a particular polyolefin film at an elevated temperature required for reasonably rapid evaporation of the solvent without deleteriously affecting the film.

Various aliphatic and aromatic solvents known to have these general properties can be used. Representative examples of such solvents include heptane, toluene, and the low-boiling esters of alkanols with alkanoic acids, such as ethyl acetate, methyl formate, methyl propionate, propyl acetate and the like. If desire, a mixture of two or more suitable organic solvents can be used. For example, the ingredients making up the bond-forming portion can be initially dissolved in a solvent in which they are more soluble, such as toluene, and the resultant solution thereafter diluted to the desired concentration for coating with another suitable solvent, such as ethyl acetate.

The bond formers of the adhesive composition consists essentially of about 70 to about 90, preferably about 76, weight % of an ethylene-vinyl acetate copolymer which contains about 20 to about 40 weight % vinyl acetate, about 10 to about 30, preferably about 22.5, weight % of an organic solvent-soluble tackifying resin, and 0 to about 5, preferably about 1.5, weight % of a permanent plasticizer which is compatible with the ethylene-vinyl acetate copolymer. These weight percentages are based on the total weight of the bond formers in the liquid adhesive composition and, thus, are indicative of the composition of the residual adhesive layer after the solvent has been removed.

While ethylene-vinyl acetate copolymers containing vinyl acetate within the above-described range are suitable, those containing vinyl acetate in amounts near the upper end of the range are preferred because of their higher solubility in organic solvents.

Various commercially available tackifying resins, which are employed in conventional adhesive compositions and are soluble in the particular organic solvent employed, can be used. Suitable tackifying resins include wood and gum rosins, hydrogenated rosins, polymerized and partially polymerized rosins; glycol, glycerol and pentaerythritol esters of such rosins and rosin derivatives; resins formed by condensing a terpene, such as alpha and beta pinene, with phenol; and mixtures therof. When the adhesive composition is used in the production of packaging materials for food packages, tackifying resins having little or no odor are preferred, such as Hercules Ester Gum 8BG which is a purified glycerol ester of wood rosin.

Plasticizers suitable for optional use in the adhesive composition include various commercially available liquid plasticizers which are compatible with ethylene-vinyl acetate copolymers and solid plasticizers which are compatible with ethylene-vinyl acetate copolymers and are soluble in the particular organic solvent being used. Santicizer 141, a liquid alkyl aryl phosphate marketed by Monsanto Company, is particularly suitable for use in the adhesive composition.

For best use in conventional plastic film laminating apparatus including a grooved or etched surface dip cylinder for applying a coating of a liquid adhesive to one surface of a plastic film passed thereover, the liquid adhesive composition contains about 65 to about 90, preferably about 75, weight % of the solvent and about 10 to about 35, preferably about 25, weight % of the bond formers based on the total weight of the solvent solution, i.e., the liquid adhesive composition. The bond formers, when expressed as a percent of the total weight of the liquid adhesive composition including the solvent, consists essentially of about 7 to about 32, preferably about 19, weight % of the ethylene-vinyl acetate copolymer, about 2 to about 14, preferably 5.6, weight % of the tackifying resin, and 0 to 2, preferably about 0.4, weight % of the plasticizer.

The liquid adhesive composition is prepared by heating the solvent to a temperature below its boiling point, e.g., about 90°–120° F when toluene or ethyl acetate is used, slowly adding the ethylene-vinyl acetate copolymer with stirring until the resin is completely dissolved in the solvent, and then slowly adding the tackifying resin, and plasticizer if used, with stirring until all of the bond formers are completely dissolved in the solvent. The particular sequence for adding the bond formers is not critical.

After a thin coating of the liquid adhesive composition is applied to at least one film surface, the solvent is removed, preferably by forced drying to accelerate evaporation. The resultant layer of bond formers should be substantially free of solvent after drying in order to prevent odor problems and/or possible solvent contamination of articles packaged in the laminated film.

A three-ply, flexible, laminated, heat-sealable packaging material embodying one aspect of the invention includes a center of core film of oriented polypropylene coated on both sides with a thin layer of a vinylidene chloride copolymer (Saran) to improve impermeability to gas and moisture, an inner film of a heat-sealable polymeric material adhesively bonded to one side of the core film. with a conventional laminating glue or adhesive, and an outer film of polypropylene adhesively bonded to the other side of the core film by the adhesive composition of the invention.

The core film preferably is a balanced, heat-set, biaxially oriented polypropylene because of its low cost and dimensional stability when exposed to elevated temperatures during heat sealing. While 0.9 mil Saran-coated polypropylene generally is used, the thickness of the core film can vary from about 0.5 to about 1.5 mil.

The inner film can be formed from any thermoplastic polymeric material which is heat-sealable at a temperature below 300° F, preferably below 250° F. A co-extruded film composed of a layer of polyethylene and a layer of an ethylene-vinyl acetate copolymer containing about 18 weight % vinyl acetate is preferred. However, other low temperature films such as polyethylene and ethylene-vinyl acetate copolymers can be used. When a co-extruded film of polyethylene and an ethylene-vinyl acetate copolymer is used as the inner film, the polyethylene side is bonded to the core film and the ethylene-vinyl acetate copolymer side becomes the inner face of the resultant laminated packaging material. The inner film preferably is about 2 mils (e.g., 1.5 mil polyethylene and 0.5 ethylene-vinyl acetate copolymer when the above-described co-extruded film is used) but may range from 1 to 3 mils.

The inner film is adhesively bonded to the core film with a conventional laminating glue, such as an urethane-isocyanate system and other adhesive systems employing curing-type polymers which cross link. This adhesive is applied to one surface of the core film, preferably by a dip cylinder in a conventional plastic film laminating machine. Generally, the amount of adhesive applied as a coating is within the range of 1 to 1.5 pounds of solids per 3,000 square feet of film.

In accordance with a preferred embodiment, the outer film is a balanced, heat-set, biaxially oriented polypropylene similar to that used for the core film except it is not coated with Saran. However, the outer film can also be a film of such polypropylene or polyethylene terephthalate (DuPont's "Mylar"), coated on one or both sides with Saran. While not necessary for all applications, at least the inner surface of the outer film (when not Saran-coated) preferably is treated in a suitable manner to facilitate bonding. Treatment methods for this purpose are well known and include subjecting the film surface to an electrical corona discharge, to an open gas flame or to the action of certain chemical agents. As used herein, the term "treated" means the film surface has undergone some form of such treatment. The thickness of the outer film preferably is about 0.45 mil but may range from about 0.2 to about 1 mil. Generally, when Mylar is used for the outer film, films having a thickness at the lower end of this range can be used without substantially reducing the structural integrity of the laminate.

The outer film is bonded to the core film by coating the inner surface thereof with a layer of the liquid adhesive composition of the invention, removing the solvent from the adhesive layer and pressing the adhesive-coated surface of the outer film into contact with the core film. This can be conveniently accomplished with a conventional plastic film laminating machine including a first set of pressure rollers, one being a dip cylinder having a grooved or etched surface adapted for applying a coating of liquid adhesive on one surface of the film in a manner well known in the art, an oven through which the film is passed for forced drying to evaporate the solvent, and a second set of pressure rollers, one of which is heated to a suitable temperature for bonding, e.g., about 150°-200° F, and between which the outer film and the core film are passed for bonding together in the usual manner. The inner film is first passed through the first set of rollers for the application of a coating of the liquid adhesive, then passed through the oven wherein it is heated to an elevated temperature to evaporate substantially all of the solvent from the adhesive coating, e.g., 100°-175° F, and finally between the second set of rollers, along with the core film and with the adhesive-coated surface of the outer film facing the Saran-coated side of the core film, to bond the films together and complete the lamination process.

Generally, the liquid adhesvie is applied at a coating rate in the range from 2 to 6 pounds of solids or bond formers per 3,000 square feet of film and preferably at a coating rate of about 3-4 pounds of solids or bond formers per 3,000 square feet of film.

For batch operations where rapid removal of the solvent is not required, the solvent in the adhesive coating can be removed by heating the film to lower temperatures for longer time periods or even by storing the film at room temperature for a few days.

If the ethylene-vinyl acetate copolymer used in the liquid adhesive composition contains higher amounts of vinyl acetate, e.g., 35-40 %, and the adhesive composition is used immediately after preparation while still at an elevated temperature, it normally will not have to be heated prior to the coating operation. If the liquid adhesive composition is prepared in advance and allowed to cool to room temperature or the ethylene-vinyl acetate copolymer used contains lower amounts of vinyl acetate, it preferably should be heated to and maintained at about 100° F or higher to insure that the bond formers remain in solution and to facilitate application by a dip cylinder or the like.

A two-ply, flexible, laminated, heat-sealable packaging material embodying another aspect of the invention includes an outer film having the same general composition and physical characteristics as the core film for the above-described three-ply material and an inner film having the same general composition and physical characteristics as the inner film for the above-described three-ply material. The inner film is adhesively bonded to the outer film by coating either one side of the outer film or the polyethylene side of the inner film with the liquid adhesive composition of the invention and otherwise following the steps discussed above. Also, it is within the scope of the invention to bond two or more polyolefin films together with the adhesive composition of the invention.

The following example is presented to illustrate a preferred specific embodiment of the invention and should not be construed to limit the invention to the particular features described therein.

EXAMPLE

A core film of 0.9 mil, heat-set, biaxially oriented polypropylene coated on both sides with Saran (Propafilm supplied by Imperial Chemical Industries, Ltd., London, England) was adhesively laminated to an inner film composed of a co-extruded 1.5 mil layer of polyethylene and a 0.5 mil layer of an ethylene-vinyl acetate copolymer containing about 18.6 weight % vinyl acetate (VP-10 supplied by Pierson Industries, Palmer, Massachusetts). The lamination was performed in a conventional urethane-isocyanate laminating adhesive (Morton 333 supplied by Morton Chemical Division of Morton-Norwich Products, Inc.). The adhesive was applied to one surface of the Saran-coated polypropylene film by a dip cylinder at a coating rate of about 1 pound of solids per 3,000 square feet of film. The polyethylene side of the inner film was pressed against the adhesive-coated side of the core film by passing the two films between a pair of pressure rollers, a rubber roller and a metal roller heated to about 175° F.

An outer film of 0.45 mil uncoated, heat-set, biaxially oriented polypropylene (hercules B523) was adhesively bonded to the other side of the Saran-coated polypropylene core film in a conventional plastic laminating machine by an adhesive composition of the invention. The inner surface of the outer film was treated by a conventional electrical corona discharge technique to increase its receptivity to the liquid adhesive.

The bond-forming portion of the adhesive composition had the following formulation:

| Ingredient | Wt. %, Based on Total Weight of Bond Formers |
|---|---|
| Ethylene-vinyl acetate copolymer[1] | 76 |
| Tackifying resin[2] | 22.5 |
| Plasticizer[3] | 1.5 |
| | 100.0 |

[1]Elvax 40, an ethylene-vinyl acetate copolymer containing about 40.0 wt. % vinyl acetate supplied by du Pont (E.I.) de Nemours & Co.
[2]Hercules Ester Gum 8BG, a refined glycerol ester of wood rosin supplied by Hercules, Inc.
[3]Santicizer 141, a liquid alkyl aryl phosphate supplied by Monsanto Co.

The adhesive composition was compounded as a toluene solution with toluene comprising about 75 % of the total solution. The solvent was placed in a vessel and heated to about 110° F. The ethylene-vinyl acetate copolymer resin in pellet form was added to the heated solvent and the mixture stirred with a suitable mixer for about 30 minutes until the resin was completely dissolved and a relatively clear solution was formed. The tackifying resin and plasticizer were then slowly added to the solution under agitation and mixing continued until all the ingredients were completely dissolved to form a straw colored solution.

While still warm, the resulting liquid adhesive composition was introduced into the pan for the dip cylinder of the laminating machine. The liquid adhesive was applied as a coating on the treated surface of the outer polypropylene film at a coating rate of about 3 pounds of solids per 3,000 square feet of film by the dip cylinder. The adhesive coated outer film was then passed through a forced air oven, including an exhaust system and heated to about 150° F, to evaporate substantially all the solvent and form a thin, tacky layer of the bond formers on the outer film. The adhesive-coated outer film was then passed between a pair of pressure rollers, the metal one of which was heated to about 175° F, along with the previously formed laminate composed of the core film and the co-extruded inner film and with the adhesive coated side facing the other Saran-coated side of the core film, to bond these films together and produce a three-ply, flexible, laminated, heat-sealable packaging material.

This film was used for packaging chunks of natural cheese. The packages were formed with a conventional cheese wrapper machine which employed an inert gas flush to purge air from the packages and means for heat sealing the ends of the package after flushing. These packages were subjected to testing for determining the integrity of the bond between the outer film and the core film, the integrity of the heat seal, and the resistance to flex cracking and pinhole development. The packages were found to have acceptable resistance to delamination, heat seals of acceptable strength, and resistance to flex cracking and pinhole development comparable to that exhibited by three-ply flexible packaging materials reported by the supplier to be made by the preferred extrusion laminating process disclosed in the above-identified U.S. Pat. No. 3,445,324.

Thus, even though the outer film was adhesively laminated to the core film by a conventional laminating machine, instead of by expensive extrusion equipment, the resultant laminate had properties comparable to packaging material made by extrusion laminating. This means small plastic film processors having conventional adhesive laminating equipment and using a liquid adhesive composition of the invention can produce a flexible, laminated, heat-sealable packaging material which is competitive with a packaging material made by substantially more expensive extrusion equipment.

A two-ply, laminated heat-sealable packaging material was made bonding together a 1.1 mil sheet of heat-set, biaxially oriented polypropylene coated on both sides with Saran and a 2 mil sheet of the co-extruded polyethylene/ethylene-vinyl acetate described above with the same adhesive composition and under the same conditions described above.

Further, a laminate satisfactory for use as a packaging material was produced by adhesive laminating two films of untreated biaxially oriented polypropylene with the liquid adhesive composition of the invention.

From the foregoing description, one skilled in the art can easily ascertain the essential characteristics of the invention, and without departing from the spirit and scope thereof, can make various changes and modifications to adapt it to various usages and conditions.

What is claimed is:

1. A flexible, laminated, heat-sealable packaging material comprising
    a core film of biaxially oriented polypropylene coated on both sides with a layer of a vinylidene chloride copolymer,
    an inner film of a heat-sealable polymeric material bonded to one side of said core film, and
    an outer film of biaxially oriented polypropylene or a polyethylene terephthalate bonded to the other side of said core film by an intervening adhesive layer consisting essentially of about 70 to about 90 weight % of an ethylene-vinyl acetate copolymer which contains about 20 to about 40 weight % vinyl acetate, about 10 to about 30 weight % of a tackifying resin, and 0 to about 5 weight % of a plasticizer which is compatible with said ethylene-vinyl acetate copolymer.

2. A packaging material according to claim 1 wherein said tackifying resin is selected from the group consisting of rosins, rosin polymers, polyhydric alkanol esters of rosin, terpene-phenol resins, and mixtures thereof.

3. A packaging material according to claim 2 wherein said inner film is composed of co-extruded layers of polyethylene and an ethylene-vinyl acetate copolymer with the polyethylene layer thereof bonded to said core film.

4. A packaging material according to claim 3 wherein said adhesive layer is composed of about 76 weight % of said ethylene-vinyl acetate copolymer, about 22.5 weight % of a glycerol ester of polymerized rosin and about 1.5 weight % of an alkyl aryl phosphate plasticizer.

5. A flexible, laminated, heat-sealable packaging material comprising
an outer film of biaxially oriented polypropylene or a polyethylene terephthalate, and
an inner film of a heat-sealable, polymeric material bonded to one side of said outer film by an intervening adhesive layer consisting essentially of about 70 to about 90 weight % of an ethylene-vinyl acetate copolymer which contains about 20 to about 40 weight % vinyl acetate, about 10 to about 30 weight % of a tackifying resin, and 0 to about 5 weight % of a plasticizer which is compatible with said ethylene-vinyl acetate copolymer.

6. A packaging material according to claim 5 wherein at least one side of said outer film is coated with a layer of a vinylidene chloride.

7. A packaging material according to claim 6 wherein said inner film is composed of co-extruded layers of polyethylene and an ethylene-vinyl acetate copolymer with the polyethylene layer thereof bonded to said outer film.

8. A flexible, laminated, heat-sealable packaging material according to claim 5 wherein said tackifying resin is selected from the group consisting of rosins, rosin polymers, polyhydric alkanol esters of rosin, terpene-phenol resins, and mixtures thereof.

* * * * *